United States Patent
Bakeev et al.

(10) Patent No.: US 10,759,662 B2
(45) Date of Patent: Sep. 1, 2020

(54) SYSTEMS AND METHODS FOR REDUCING FORMATION OF SCALE IN PHOSPHORIC ACID PRODUCTION

(71) Applicant: SOLENIS TECHNOLOGIES, L.P., Wilmington, DE (US)

(72) Inventors: Kirill N. Bakeev, Newark, DE (US); Andrew M. DiMaio, Oxford, PA (US); Anthony M. Shepherd, Millsboro, DE (US)

(*) Notice: Subject to any disclaimer, the term of this patent is extended or adjusted under 35 U.S.C. 154(b) by 177 days.

(21) Appl. No.: 15/918,079

(22) Filed: Mar. 12, 2018

(65) Prior Publication Data
US 2019/0276314 A1 Sep. 12, 2019

(51) Int. Cl.
C01B 25/222 (2006.01)
C01B 25/22 (2006.01)

(52) U.S. Cl.
CPC ........ *C01B 25/222* (2013.01); *C01B 25/2204* (2013.01)

(58) Field of Classification Search
CPC ....... C01B 25/18; C01B 25/22; C01B 25/222; C01B 25/2204
See application file for complete search history.

(56) References Cited

U.S. PATENT DOCUMENTS

| | | |
|---|---|---|
| 3,397,956 A | 8/1968 | Buchanan et al. |
| 3,972,981 A | 8/1976 | Harper et al. |
| 4,221,769 A | 9/1980 | Harper et al. |
| 4,393,032 A | 7/1983 | Drechsel et al. |
| 5,120,519 A | 6/1992 | Gross |
| 6,162,391 A | 12/2000 | Kowata et al. |
| 6,620,328 B2 | 9/2003 | Zidovec |

(Continued)

FOREIGN PATENT DOCUMENTS

| | | |
|---|---|---|
| CA | 1087061 | 10/1980 |
| CN | 1673071 A | 2/2005 |

(Continued)

OTHER PUBLICATIONS

R.M. Behbahani, et al., Heat Exchanger Fouling in Phosphoric Acid Evaporators, Refereed Proceedings, Engineering Conferences International, ECI Digital Archives, 2003, http://dc.engconfintl.org/heatexchanger/9.

(Continued)

*Primary Examiner* — Anthony J Zimmer
(74) *Attorney, Agent, or Firm* — Lorenz & Kopf, LLP

(57) ABSTRACT

A method for reducing formation of scale in phosphoric acid production is provided herein. Phosphate-containing ore is combined with an acid to form an acidic slurry and the acidic slurry is processed to form an acidic stream. The method includes providing a scale inhibitor including an inorganic phosphate. The method further includes combining the scale inhibitor and at least one of the phosphate-containing ore, the acidic slurry, and the acidic stream, to reduce the formation of scale. A system for phosphoric acid production exhibiting a reduced formation of scale is also provided herein. The system includes a substrate having a surface in contact with at least one of the phosphate-containing ore, the acidic slurry formed from the phosphate-containing ore and the acid, and the acidic stream formed from the acidic slurry. The system including the scale inhibitor exhibits a reduced formation of scale on the surface.

18 Claims, 4 Drawing Sheets

(56) References Cited

U.S. PATENT DOCUMENTS

| | | |
|---|---|---|
| 8,900,539 B2 | 12/2014 | Ravishankar et al. |
| 9,028,787 B2 | 5/2015 | Ravishankar et al. |
| 9,242,863 B2 | 1/2016 | Ravishankar et al. |
| 2009/0294372 A1 | 12/2009 | Gill et al. |
| 2011/0076219 A1 | 3/2011 | Ravishankar et al. |
| 2012/0244058 A1 | 9/2012 | Ravishankar et al. |
| 2015/0225241 A1 | 8/2015 | Zhang et al. |

FOREIGN PATENT DOCUMENTS

| | | |
|---|---|---|
| CN | 1762857 A | 4/2006 |
| CN | 101758048 A | 6/2010 |
| CN | 101759302 A | 6/2010 |
| CN | 101786613 A | 7/2010 |
| CN | 101811783 A | 8/2010 |
| CN | 102241394 B | 8/2012 |
| CN | 102874938 A | 1/2013 |
| CN | 102874939 A | 1/2013 |
| CN | 103253644 A | 8/2013 |
| CN | 102431979 B | 7/2014 |
| CN | 104692346 A | 6/2015 |
| CN | 105481117 A | 4/2016 |
| CN | 106007014 A | 10/2016 |
| GB | 1406884 | 9/1975 |
| GB | 1433123 | 4/1976 |
| GB | 1451609 | 10/1976 |
| KR | 20150077190 A | 7/2015 |
| TN | 2010000546 A1 | 5/2012 |
| WO | 2011038108 A1 | 3/2011 |
| WO | 2011038167 A1 | 3/2011 |
| WO | 2012128755 A1 | 9/2012 |
| WO | 2015123294 A1 | 8/2015 |
| WO | 2016130817 A1 | 8/2016 |

OTHER PUBLICATIONS

Prayon Technologies, S.A., Prayon Process for Phosphoric Acid Production, Services Brochure, Undated, Admitted Prior Art.

SYSTEMS AND METHODS FOR REDUCING FORMATION OF SCALE IN PHOSPHORIC ACID PRODUCTION

TECHNICAL FIELD

The present disclosure generally relates to systems and methods for reducing formation of scale in phosphoric acid production and more particularly relates to systems and methods utilizing a scale inhibitor for reducing formation of scale.

BACKGROUND

The processing of various types of ore and other materials can be conducted in an acidic environment to produce a desired product. In wet process phosphoric acid production, a crude ore that has been initially processed by washing, desliming, flotation, grinding, or combinations thereof is digested in an acidic solution. After digestion is completed the resulting slurry is subjected to filtration followed by evaporation of the acid stream. Clarification is then performed to produce the desired product.

Wet process phosphoric acid production is typically performed under harsh conditions, such as high temperature, high phosphoric acid concentrations, and high soluble polyvalent ions such as Fe, Al, and others. As a result of these harsh conditions during processing of ores and other materials, scale deposits may form. The scale formation occurs primarily in the digesters, evaporators, and equipment associated therewith. A certain amount also occurs on other surfaces of the process including the filtration systems. Particularly troublesome is scaling of heat exchanger surfaces. Some attempts to correct this problem have been directed to equipment design but even the best-designed equipment is not capable of preventing scale formation. Further, the acidic and high multivalent cations environment typically render conventional scale inhibitors ineffective.

The primary by-product from the digestion of phosphate ore is calcium sulfate ($CaSO_4$) and its hydrated variations. These primary by-products are typically the main source of scale deposition. There are different crystallographic forms of calcium sulfate responsible for scale deposition. These forms, calcium sulfate dihydrate or gypsum ($CaSO_4 \cdot 2H_2O$), calcium sulfate hemihydrate ($CaSO_4 \cdot \frac{1}{2}H_2O$), and calcium sulfate anhydrite ($CaSO_4$), are dependent on temperature and the residence time within the process. This phase transformation between forms adds to the complexity of their inhibition. Additional components of these scale depositions can include fluorosilicate salts, barium sulfate, calcium fluoride, or other materials depending on the composition of the process stream and specific process conditions.

Generally, the wet process production of phosphoric acid involves the digestion of a phosphate containing ore slurry with sulfuric acid. The resulting phosphoric acid is separated from precipitated calcium sulfate and other solid impurities by filtration. The phosphoric acid solution is then concentrated through multiple steps of evaporation and clarification to yield the finished phosphoric acid (50-80% phosphoric acid). Although much of the calcium sulfate and other impurities are removed during the filtration step, a significant amount remains dissolved in the process stream after filtration. As the phosphoric acid is concentrated through the evaporator circuit(s), calcium sulfate of various forms continues to precipitate from solution resulting in scale deposition on high temperature surfaces due to the low solubility of the scale and temperature at which the process is performed. This and other deposits negatively impact heat transfer to the process stream as well as restrict liquor flow. Consequently, the scale must be removed through periodic cleanouts. Thus, the scale deposition causes significant loss of process efficiency and results in added cost.

For example, scale deposition in the harsh operation conditions of phosphoric acid production (e.g., at a temperature of 60° C. and above, phosphoric acid concentration [$H_3PO_4$] at 42% and above, and Fe & Al ions as high as 8,000 ppm) can cause significant downtime and production loss associated with frequent process lines cleaning and descaling including belt filters, heat exchangers, and evaporators.

Accordingly, it is desirable to provide systems and methods for reducing formation of scale in phosphoric acid production. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments of a scale inhibitor for reducing formation of scale in phosphoric acid production, and various non-limiting embodiments of systems and methods for the same, are disclosed herein.

In a non-limiting embodiment, a method for reducing formation of scale in phosphoric acid production is provided herein. Phosphate-containing ore is combined with an acid to form an acidic slurry and the acidic slurry is processed to form an acidic stream. The method includes, but is not limited to, providing a scale inhibitor. The scale inhibitor may include, but is not limited to, an inorganic phosphate according to formula (I),

$$(XPO_3)_m \quad \quad (I)$$

wherein X is Na, K, H, or combinations thereof, and m is an integer having a value of at least 6.
The scale inhibitor may include, but is not limited to, an inorganic phosphate according to formula (II),

$$Y_{n+2}P_nO_{3n+1} \quad \quad (II)$$

wherein Y is Na, K, H, or combinations thereof, and n is an integer having a value of at least 6.
The scale inhibitor may include both the inorganic phosphate of formula (I) and the inorganic phosphate of formula (II). The method further includes, but is not limited to, combining the scale inhibitor and at least one of the phosphate-containing ore, the acidic slurry, and the acidic stream, to reduce the formation of scale.

In another non-limiting embodiment, a system for phosphoric acid production exhibiting a reduced formation of scale is provided herein. The system includes, but is not limited to, a substrate having a surface in contact with at least one of the phosphate-containing ore, the acidic slurry formed from the phosphate-containing ore and the acid, and the acidic stream formed from the acidic slurry. The system further includes, but is not limited to, the scale inhibitor. The system including the scale inhibitor exhibits a reduced formation of scale on the surface as compared to a system free of the scale inhibitor.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
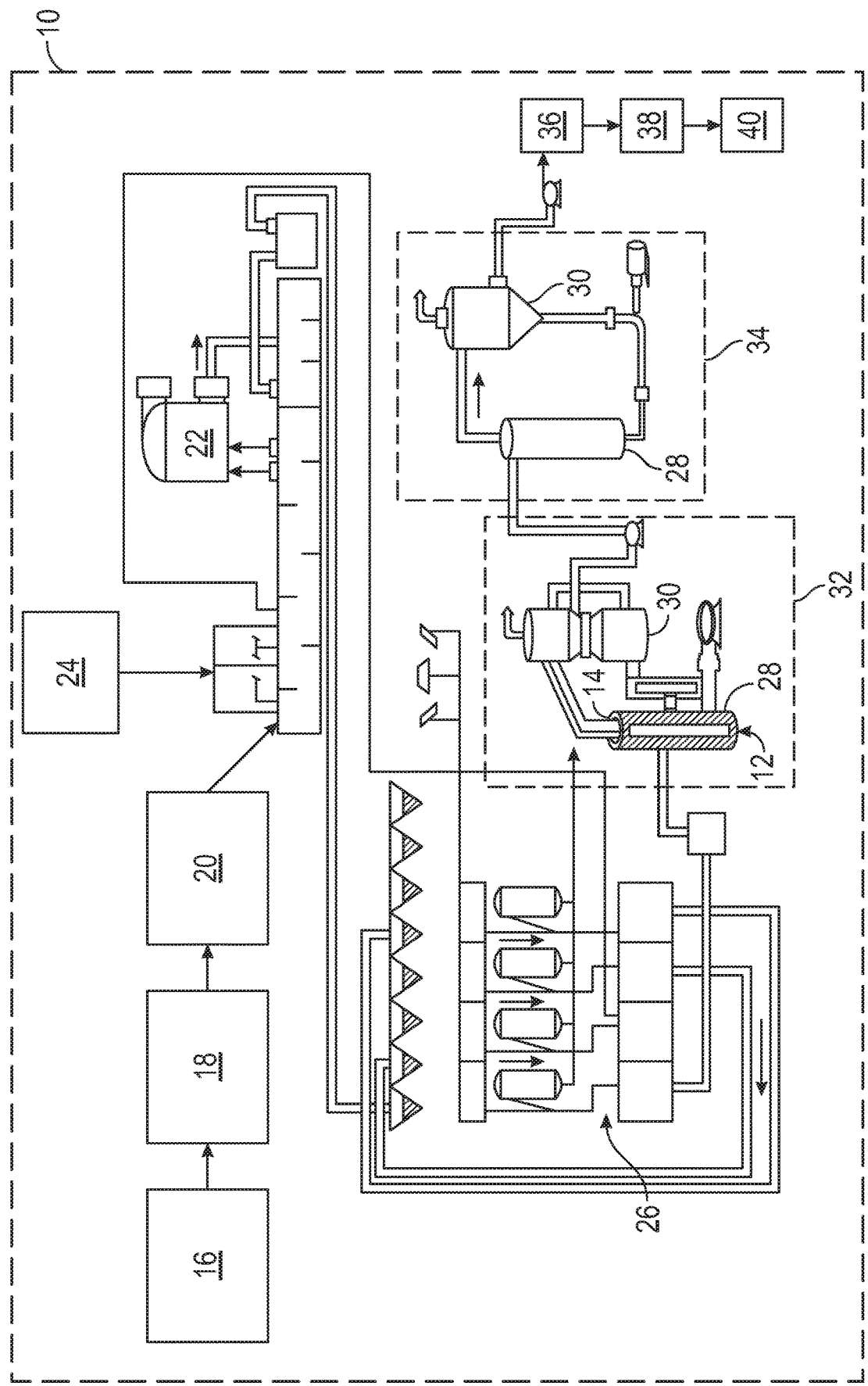
FIG. 1 is a flow chart illustrating a non-limiting embodiment of a system for phosphoric acid production exhibiting a reduced formation of scale.
Figure 2:
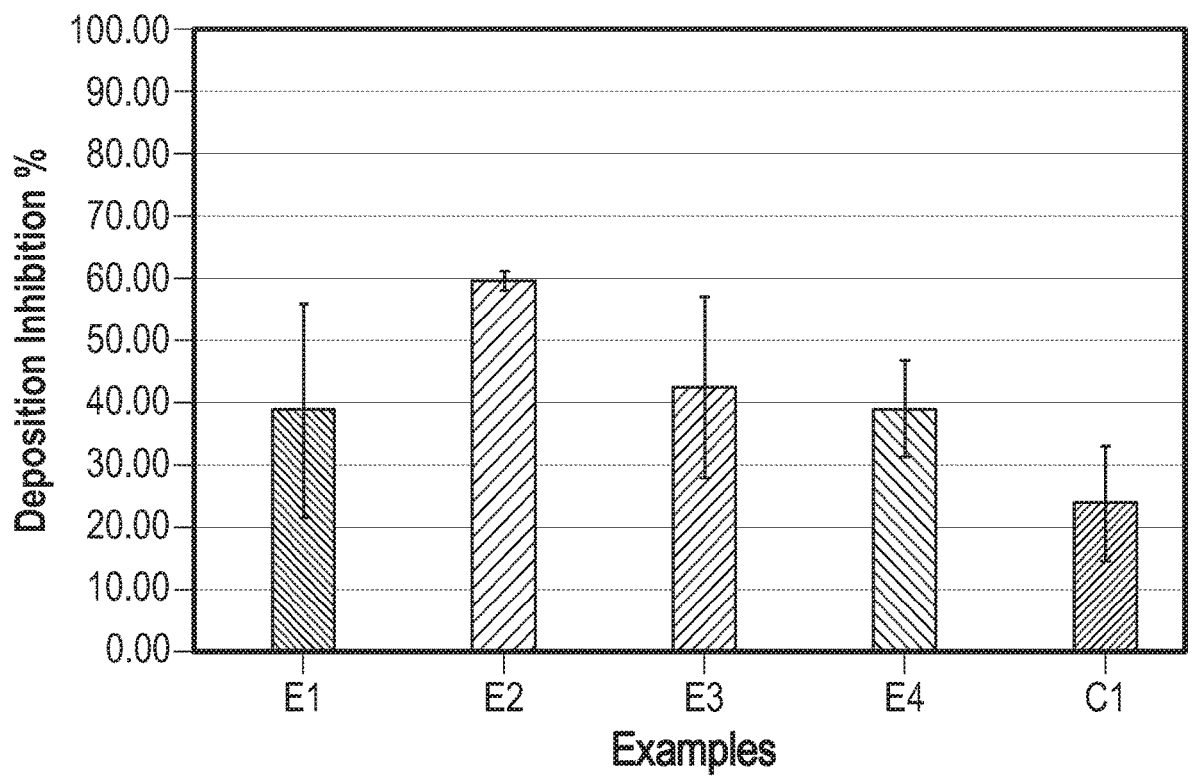
FIG. 2 is a chart illustrating experimental data of a non-limiting embodiment of the system of FIG. 1.
Figure 3:
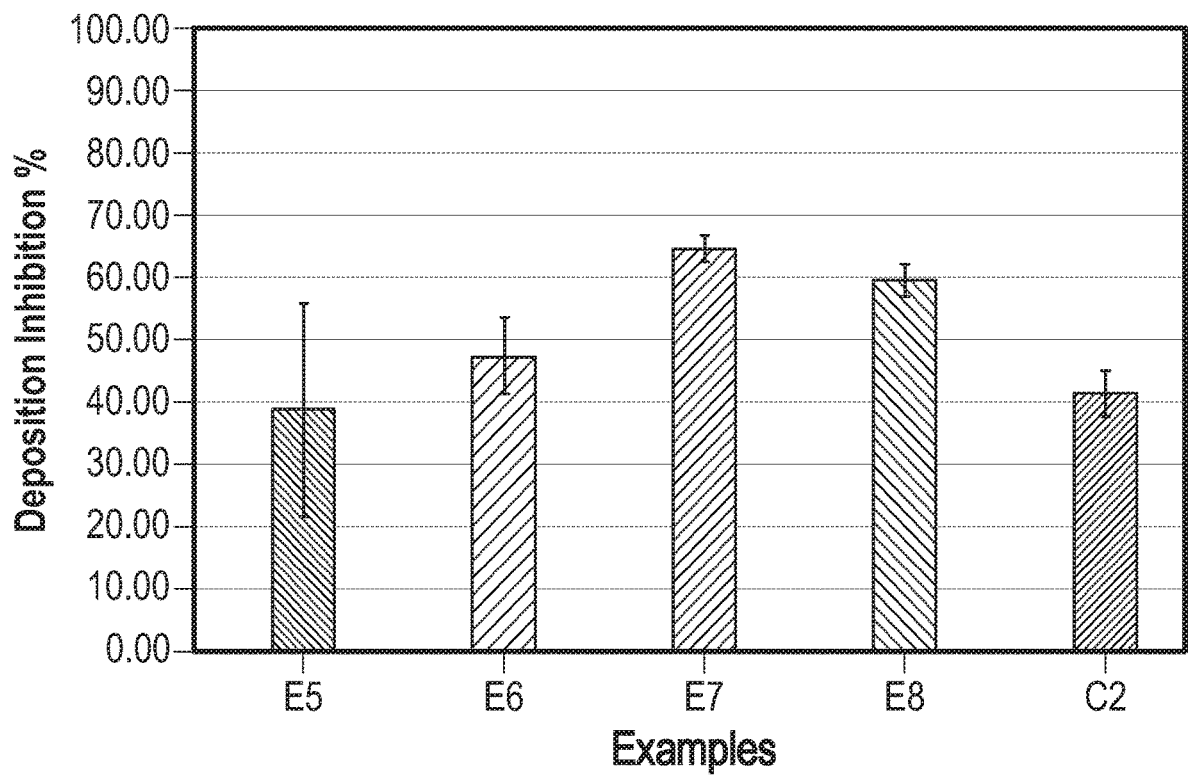
FIG. 3 is chart illustrating additional experimental data of a non-limiting embodiment of the system of FIG. 1.
Figure 4:
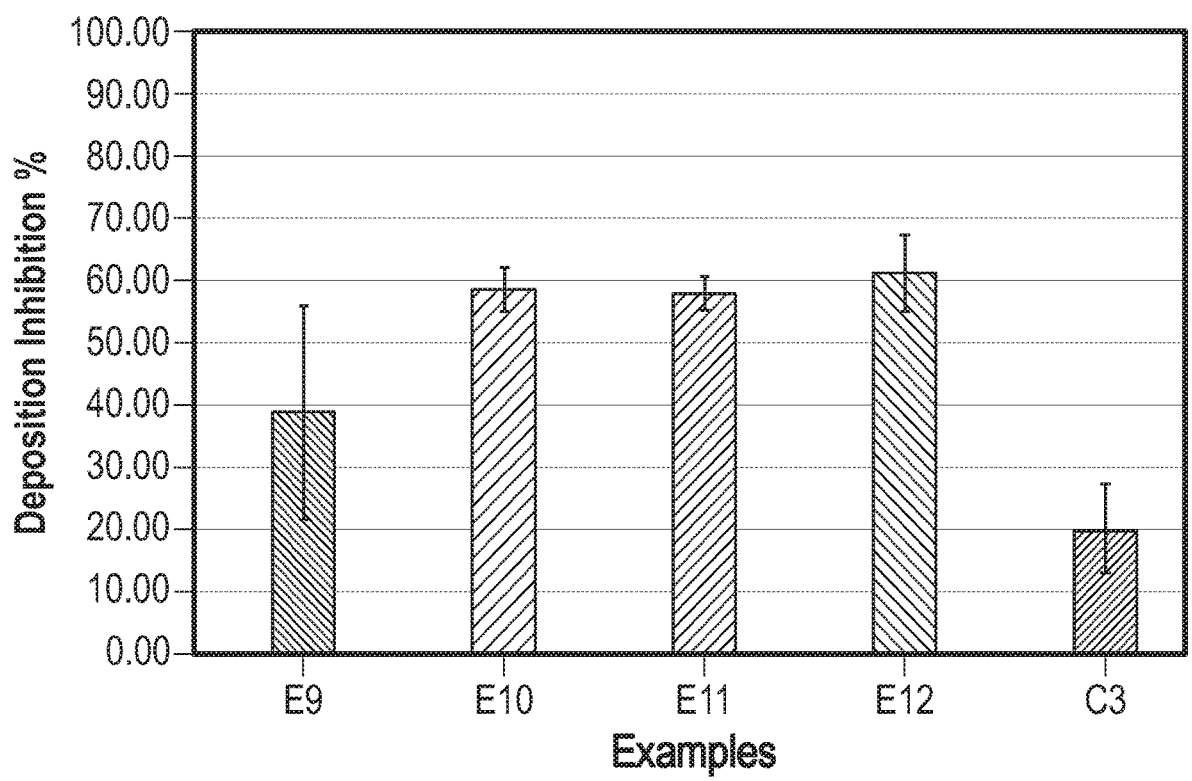
FIG. 4 is chart illustrating additional experimental data of a non-limiting embodiment of the system of FIG. 1.
Figure 5:
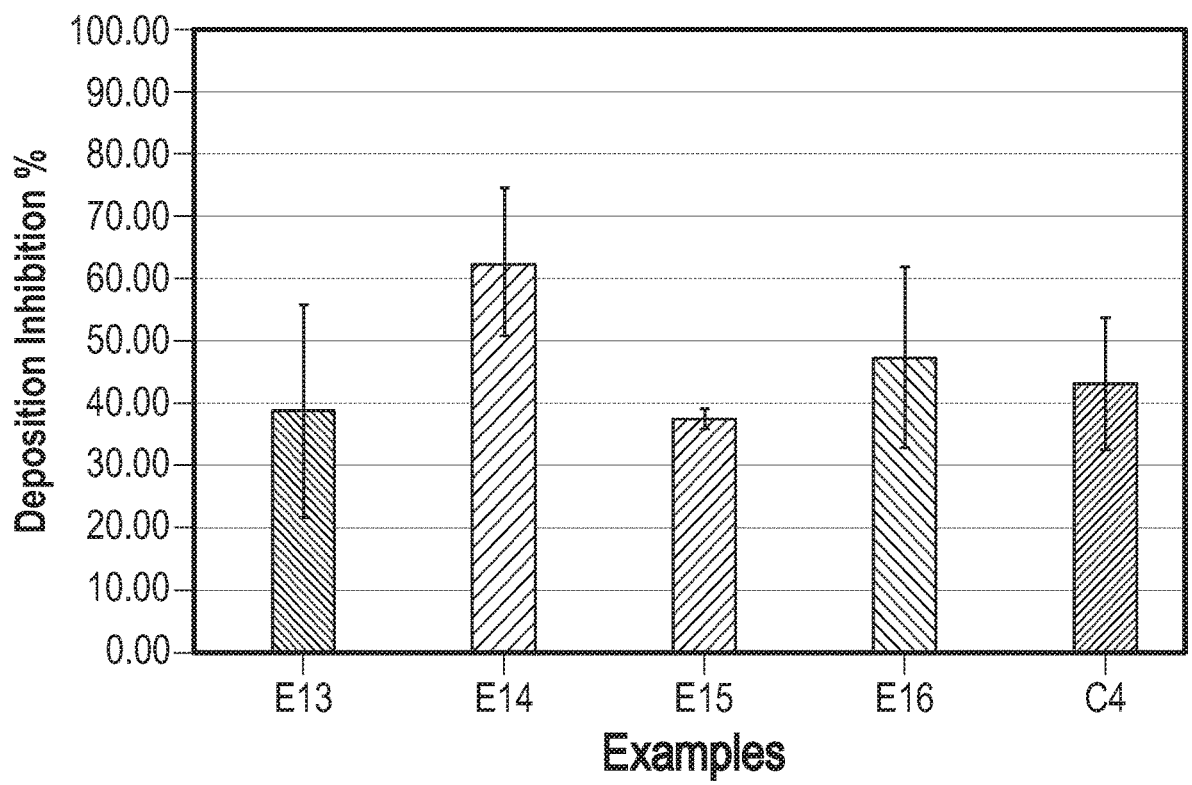
FIG. 5 is chart illustrating additional experimental data of a non-limiting embodiment of the system of FIG. 1.

The following detailed description is merely exemplary in nature and is not intended to limit the systems and methods as described herein. Furthermore, there is no intention to be bound by any theory presented in the preceding background or the following detailed description.

A scale inhibitor for reducing formation of scale in phosphoric acid production is provided herein. The scale may include calcium sulfate, and its crystallographic forms, including calcium sulfate dihydrate or gypsum ($CaSO_4 \cdot 2H_2O$), calcium sulfate hemihydrate ($CaSO_4 \cdot \frac{1}{2}H_2O$), and calcium sulfate anhydrite ($CaSO_4$). However, it is to be appreciated that the formation of scale resulting from other compounds may be reduced by the scale inhibitor. The scale components may include also $Na_2SiF_6$, $K_2SiF_6$, $NaKSiF_6$, $MgAlF_5$ in various hydrated forms and other salt variations formed as the result of acid digestions of phosphate rock containing various impurities. The scale may result as a by-product generated during the processing of phosphate-containing ore for the production of phosphoric acid.

The scale inhibitor includes an inorganic phosphate. In embodiments, the scale inhibitor includes an inorganic phosphate according to formula (I),

$$(XPO_3)_m \qquad (I)$$

wherein X is Na, K, H, or combinations thereof, and m is an integer having a value of at least 6.

In certain embodiments, X is Na. The integer m of formula (I) may have a value of at least 7, alternatively at least 8, alternatively at least 9, alternatively at least 10, alternatively at least 11, or alternatively at least 12. The integer m of formula (I) may have a value of from 6 to 30, alternatively from 6 to 20, or alternatively from 6 to 10. Non-limiting examples of suitable inorganic phosphates of formula (I) include sodium hexametaphosphate ($(NaPO_3)_6$), sodium heptametaphosphate ($(NaPO_3)_7$), sodium octametaphosphate ($(NaPO_3)_8$), sodium nonametaphosphate ($(NaPO_3)_9$), and sodium decametaphosphate ($(NaPO_3)_{10}$). In certain embodiments, the inorganic phosphate of formula (I) includes sodium hexametaphosphate ($(NaPO_3)_6$) ("SHMP") wherein m of formula (I) is an integer having a value of 6. SHMP may be commonly referred to in the art as "regular chain" SHMP.

In embodiments, the scale inhibitor includes an inorganic phosphate according to formula (II),

$$Y_{n+2}P_nO_{3n+1} \qquad (II)$$

wherein Y is Na, K, H, or combinations thereof, and n is an integer having a value of at least 6.

In certain embodiments, Y is Na. The integer n of formula (II) may have a value of at least 7, alternatively at least 8, alternatively at least 9, alternatively at least 10, alternatively at least 11, alternatively at least 12, or alternatively at least 21. The integer n of formula (II) may have a value of from 6 to 30, alternatively from 8 to 30, or alternatively from 10 to 30. Non-limiting examples of suitable inorganic phosphates of formula (II) include poly(phosphates), such as sodium hexaphosphate ($Na_8P_6O_{19}$), sodium heptaphosphate ($Na_9P_7O_{22}$), sodium octaphosphate ($Na_{10}P_8O_{25}$), sodium nonaphosphate ($Na_{11}P_9O_{28}$), sodium decaphosphate ($Na_{12}P_{10}O_{31}$), sodium hendecaphosphate ($Na_{13}P_{11}O_{34}$), and sodium dodecaphosphate ($Na_{14}P_{12}O_{37}$), and sodium henicosphosphate ($Na_{23}P_{21}O_{64}$). In certain embodiments, the inorganic phosphate of formula (II) includes sodium dodecaphosphate wherein n of formula (II) is an integer having a value of 12. In various embodiments, the inorganic phosphate of formula (II) includes poly(phosphates), such as sodium henicosphosphate, wherein n of formula (II) is an integer having a value of 21. Sodium dodecaphosphate or sodium henicosphosphate may be commonly referred to in the art as "long chain" SHMP. It is to be appreciated that common usage of the term "long chain" SHMP for sodium dodecaphosphate or sodium henicosphosphate does not accurately reflect the chemical structure for sodium dodecaphosphate or sodium henicosphosphate and may reference to any "long chain" SHMP having a chain length of at least 12. Examples of suitable "long chain" SHMP include a "long chain" SHMP having an average chain length of 13 and a number average molecular weight of 1390 and a "long chain" SHMP having an average chain length of 21 and a number average molecular weight of 2200. In addition, it is to be appreciated that the chain length of the inorganic phosphate may be based on average chain length and thus may not represent all species included in the designation. For example, while sodium dodecaphosphate ($Na_{14}P_{12}O_{37}$) includes a chain length of 12, the composition represented by sodium dodecaphosphate ($Na_{14}P_{12}O_{37}$) may include other inorganic phosphate species that do not have a chain length of 12 so long as the average chain length of the composition is 12. The scale inhibitor may include both the inorganic phosphate of formula (I) and the inorganic phosphate of formula (II).

In various embodiments, an increase in chain length of the inorganic phosphates of formula (I) and formula (II) (i.e., increase in the value of m and n) provides an increase in binding affinity of the inorganic phosphates to calcium sulfate thereby reducing the formation of scale. In contrast, inorganic phosphates having a chain length of less than 6 (i.e., a value for m and n of less than 6) provide an inferior reduction in the formation of scale when utilized as a scale inhibitor without the presence of the inorganic phosphates of formula (I) and formula (II). Inorganic phosphates having a chain length of at least 6 are suitable for binding to scale microcrystals thereby inhibiting scale formation and deposition in wet phosphoric acid processes. Without being bound by theory, it is believed that inorganic phosphates having at least 6 repeating units are effective due to the heterogeneous nature of the inorganic phosphates.

In embodiments, the scale inhibitor further includes an additional inorganic phosphate according to formulas (III) or (IV),

$$(ZPO_3)_o \qquad (III)$$

$$Z_{p+2}P_pO_{3p+1} \qquad (IV)$$

wherein Z is Na, K, H, or combinations thereof, o and p are each independently integers having values of no greater than 4.

The integer o of formula (III) may have a value of 3 or 4. The integer p of formula (IV) may have a value of from 2 to 4. In certain embodiments, the additional inorganic phosphate includes tetrasodium pyrophosphate ($Na_4P_2O_7$) ("TSPP"), sodium triphosphate ($Na_5P_3O_{10}$) ("STPP"), sodium trimetaphosphate ($NaPO_3)_3$ ("STMP"), or combinations thereof.

In embodiments, the scale inhibitor further includes an organic phosphonate. The organic phosphonate may include 2-phosphonobutane-1,2,4-tricarboxylic acid ("PBTC"), 1-hydroxyethane 1,1-diphosphonic acid ("HEDP"), bis(phosphonomethyl)aminotris(methylenephosphonic acid) ("ATMP"), bis(hexamethylene triamine penta (methylene phosphonic acid)) ("BHMTPMPA"), hexamethylenediaminetetra (methylene phosphonic acid) ("HMDTMPA"), diethylene triamine pentamethylene phosphonic acid ("DETPMPA"), or combinations thereof.

In certain embodiments, the organic phosphonate includes 1-hydroxyethane 1,1-diphosphonic acid ("HEDP"), bis(hexamethylene triamine penta (methylene phosphonic acid)) ("BHMTPMPA"), hexamethylenediaminetetra (methylene phosphonic acid) ("HMDTMPA"), diethylene triamine pentamethylene phosphonic acid ("DETPMPA"), or combinations thereof. The scale inhibitor may include the additional inorganic phosphate of formula (III), the additional inorganic phosphate of formula (IV), the organic phosphonate, or combinations thereof, in addition to the inorganic phosphate of formula (I) or formula (II).

The scale inhibitor including the combination of component (A), hereinafter referring to the inorganic phosphate of formulas (I) or (II), and component (B), hereinafter referring to the additional inorganic phosphate according to formulas (III) or (IV) or the organic phosphonate, may provide an improved reduction of the formation of scale as compared to the scale inhibitor including only component (A) or component (B). Non-limiting examples of suitable scale inhibitors including combinations of component (A) and component (B) include sodium henicosphosphate and DETPMPA; sodium henicosphosphate and BHMTPMPA; sodium henicosphosphate and HMDTMPA; sodium henicosphosphate and TSPP; and sodium henicosphosphate and HEDP. The scale inhibitor may include the component (A) and the component (B) in a weight ratio of from about 1:99 to 99:1, alternatively from about 15:85 to 85:15, alternatively from about 10:90 to 90:10, or alternatively from about 20:80 to 80:20.

In certain embodiments, the additional inorganic phosphate according to formula (III) or (IV), or the organic phosphonate are combined with at least one of the phosphate-containing ore, the acidic slurry, and the acidic stream after combination of the inorganic phosphate according to formulas (I) or (II) and the additional inorganic phosphate according to formula (III) or (IV), or the organic phosphonate. For example, the component (A) and the component (B) may be first combined with each other and then combined with the at least one of the phosphate-containing ore, the acidic slurry, and the acidic stream.

In other embodiments, the additional inorganic phosphate according to formula (III) or (IV), or the organic phosphonate are combined with at least one of the phosphate-containing ore, the acidic slurry, and the acidic stream after combination of the inorganic phosphate according to formulas (I) or (II) and at least one of the phosphate-containing ore, the acidic slurry, and the acidic stream. For example, the component (A) may be first combined with at least one of the phosphate-containing ore, the acidic slurry, and the acidic stream and the component (B) may then be combined with at least one of the phosphate-containing ore, the acidic slurry, and the acidic stream.

In further embodiments, the additional inorganic phosphate according to formula (III) or (IV), or the organic phosphonate are combined with at least one of the phosphate-containing ore, the acidic slurry, and the acidic stream before combination of the inorganic phosphate according to formulas (I) or (II) and at least one of the phosphate-containing ore, the acidic slurry, and the acidic stream. For example, the component (B) may be first combined with at least one of the phosphate-containing ore, the acidic slurry, and the acidic stream and the component (A) may then be combined with at least one of the phosphate-containing ore, the acidic slurry, and the acidic stream.

It is to be appreciated that each of the component (A) and the component (B) may be independently combined with at least one of the phosphate-containing ore, the acidic slurry, and the acidic stream in a single application or in multiple applications. Further, it is to be appreciated that each of the component (A) and the component (B) may be independently applied at the same point in the process or at different points in the process.

Systems and methods for reducing formation of scale in phosphoric acid production are also provided herein. A general flow chart for production of phosphoric acid from the phosphate-containing ore is shown in FIG. 1. The system 10 includes a substrate 12 having a surface 14 in contact with at least one of a phosphate-containing ore, an acidic slurry formed from the phosphate-containing ore and an acid, and an acidic stream formed from the acidic slurry. The system 10 further includes the scale inhibitor. The system 10 including the scale inhibitor exhibits a reduced formation of scale on the surface 14 as compared to a system 10 free of the scale inhibitor.

At the onset, the scale inhibitor described above may be introduced into the system 10 or combined with the phosphate-containing ore, or resulting product thereof (e.g., the acidic slurry or the acidic stream), at any step shown in the flow chart of FIG. 1. It is to be appreciated that other steps known in the art may be utilized in the production of phosphoric acid and the scale inhibitor described above may be introduced into the system 10 at any of these other steps. The phosphate-containing ore may be sourced from a mine 16. The phosphate-containing ore may then be washed at a wash plant 18. After washing, the phosphate-containing ore may be comminuted utilizing a ball mill 20. It is to be appreciated that other comminuting techniques known in the art may be utilized.

The phosphate-containing ore may be combined with an acid to form an acidic slurry. In certain embodiments, the acid includes sulfuric acid. However, it is to be appreciated that other acids known in the art for the production of phosphoric acid may be utilized. In embodiments, the system 10 may include a digester 22 and the phosphate-containing ore may be combined with the acid in the digester 22 to form the acidic slurry. The acid may be provided to the digester from an acid source 24. Further, the scale inhibitor and the acidic slurry may be combined in the digester 22. Alternatively, or in addition to, the scale inhibitor and the acidic slurry may be combined after (i.e., downstream from) the digester 22. The introduction of the acid in the digester 22 results in an increase in acid concentration in the acidic slurry. The acidic slurry may have an acid concentration in an amount of greater than about 10%, alternatively greater than 20%, alternatively greater than about 25%, alternatively greater than about 30%, or alternatively greater than about 42%. The acidic slurry may have an acid concentration in an amount of from about 10% to about 60%, alternatively of from about 20% to about 50%, or alternatively of from about 20% to about 40%. The acidic slurry may have a temperature of at least about 30° C., alternatively at least about 50° C., or alternatively at least about 65° C. The acidic slurry may have a temperature of from about 30° C. to about 150° C., alternatively from about 50° C. to about 90° C., or alternatively from about 60° C. to about 100° C.

The acidic slurry may be processed to form an acidic stream. In embodiments, the acidic slurry is processed utilizing a filter 26, such as an acid filter, to form the acidic stream. Further, the scale inhibitor may be combined with the acidic stream after the filter 26. The acidic stream after the filter 26 may have an acid concentration in an amount of greater than about 10%, alternatively greater than about 20%, alternatively greater than about 25%, alternatively greater than about 40%, alternatively greater than about 42%. The acidic stream after the filter 26 may have an acid concentration in an amount of from about 10% to about 60%, alternatively of from about 20% to about 50%, or alternatively of from about 20% to about 30%. The acidic stream after the filter 26 may have a temperature of at least about 30° C., alternatively at least about 50° C., or alternatively at least about 65° C. The acidic stream after the filter 26 may have a temperature of from about 30° C. to about 150° C., alternatively from about 50° C. to about 100° C., or alternatively from about 60° C. to about 90° C.

The acidic stream may be further processed utilizing an evaporator 28. Further, the scale inhibitor may be combined with the acidic stream after the filter 26 and before the evaporator 28. Without being bound by theory, it is believed that while scaling can affect various components of the system 10, a reduction in scaling in the evaporator 28 can improve performance of the system 10 by reducing downtime of the system 10 for maintenance of the evaporator 28. Therefore, in certain embodiments, the scale inhibitor is combined with the acidic slurry during or after the digester 22, combined with the acidic stream after the filter 26 and before the evaporator 28, or both, for reducing the formation of scale in the evaporator 28.

In embodiments, the scale inhibitor is utilized in the acidic slurry in an amount of from about 0.1 to about 1000, alternatively from about 1 to about 500, or alternatively from about 10 to 300, parts per million (ppm) based on total weight of the acidic liquid phase in acidic slurry. In embodiments, the scale inhibitor is utilized in the acidic stream in an amount of from about 0.1 to about 1000, alternatively from about 1 to about 500, or alternatively from about 10 to 300, ppm based on total weight of the acidic liquid phase in acidic stream.

In embodiments, the scale inhibitor provides improved deposition inhibition in the system 10 as compared to a system free of the scale inhibitor. Phosphoric acid process scale inhibition testing may be conducted in Solenis laboratories using Solenis developed methods. Phosphoric process liquor may be simulated in the laboratory by formulating a mimic liquor based on water analysis from process liquor before the first evaporator. The phosphoric mimic liquor make-up may contain 3,500 ppm Ca-ion, 25,000 $SO_4$-ion, between 500 ppm and 2,500 ppm Fe, between 500 ppm and 2,500 ppm Al, Deionized water, and 42-57% phosphoric acid. The liquor constituents may be formed using calcium chloride dihydrate sourced from Amresco, sodium sulfate sourced from VWR, iron sulfate heptahydrate sourced from Alfa Aesar, aluminum sulfate octadecahydrate sourced from Acros, and phosphoric acid sourced from Millipore Sigma. The sulfate solution may be made down to include both the iron and aluminum ions while the Ca solution may only contain the Ca-ion. All solutions may be stored separately until use with a two day shelf life. For scale inhibition testing, C22 alloy jars with an inner surface area of 0.02 $m^2$ may be employed due to C22 alloy enhanced corrosion compatibility in phosphoric acid environments. Each jar may be cleaned and dried before each test to ensure a homogenous inner surface between the testing sets. Next, 50 mL of Ca-solution and 20-40 mL, depending on intended phosphoric acid concentration, of deionized water using a calibrated bottle-top dispenser may be dispensed into the C22 jar and set aside. After the Ca and water have been distributed to the testing jars, 50 mL of $SO_4$ solution were dispensed to the jar followed by 60-80 mL of 85% phosphoric acid using serological pipet. After the $SO_4$ solution and phosphoric acid are added to the Ca solution, the jars may be dosed with the inhibitor. It may be crucial to follow the order of addition as outlined in the aforementioned method. Once all the constituents were added, the Teflon caps may be placed on the jars and the jars may be placed into an IKA KS 4000i dry shaker set at 80° C. for 6 hours while mixing at 150 rpms. After the 6 hours elapsed, the Teflon caps may be removed and the mimic phosphoric process liquor may be decanted. The empty jars may be inverted and placed into the vented oven capable of maintaining 105° C. for approximately 16 hours. Once the jars are dry, the jars may be placed into a desiccator for approximately 1 hour to cool. After the jars are cooled, the jars may be weighed and the amount of deposited scales may be determined by weight difference.

With continuing reference to FIG. 1, the system may further include a clarifier 30 downstream from the evaporator 28 for separating by-product materials from the acidic stream, such as calcium sulfate. In embodiments, the scale inhibitor inhibits deposition of the calcium sulfate from the acidic stream by adsorbing onto scale microcrystals, preventing scale growth and agglomeration and inhibiting overall deposition onto process surfaces. The acidic stream may undergo further processing by additional evaporators 28 and clarifiers 30 for increasing concentration of phosphoric acid in the acidic stream.

For example, the system 10 may include two sets evaporators 28 and clarifiers 30. The acidic stream after processing by a first set 32 of evaporators 28 and clarifiers 30 may have an acid concentration in an amount of at least about 25, at least about 35, or at least about 40 wt. % based on total weight of the acidic stream. The acidic stream after processing by the first set 32 of evaporators 28 and clarifiers 30 may have an acid concentration in an amount of from about 30 to about 65, alternatively from about 35 to about 60, or alternatively from about 40 to about 60, wt. % based on total weight of the acidic stream. The acidic stream during processing by the first set 32 of evaporators 28 and clarifiers 30 may have a temperature of at least about 30° C., alternatively at least about 50° C., or alternatively at least about 80° C. The acidic stream during processing by the first set 32 of evaporators 28 and clarifiers 30 may have a temperature of from about 30° C. to about 150° C., alternatively from about 50° C. to about 100° C., or alternatively from about 60° C. to about 90° C.

The acidic stream after processing by a second set 34 of evaporators 28 and clarifiers 30 may have an acid concentration in an amount of at least about 40, at least about 45, or at least about 50, wt. % based on total weight of the acidic stream. The acidic stream after processing by the second set 34 of evaporators 28 and clarifiers 30 may have an acid concentration in an amount of from about 40 to about 90, alternatively from about 50 to about 80, or alternatively from about 50 to about 75, wt. % based on total weight of the acidic stream. The acidic stream during processing by the second set 34 of evaporators 28 and clarifiers 30 may have a temperature of at least about 60° C., alternatively at least about 75° C., or alternatively at least about 90° C. The acidic stream during processing by the second set 34 of evaporators 28 and clarifiers 30 may have a temperature of from about 60° C. to about 300° C., alternatively from about 75° C. to about 250° C., or alternatively from about 80° C. to about 210° C.

The system 10 may include a super phosphoric acid evaporator 36 for forming a super phosphoric acidic stream having an acid concentration in an amount of at least about 45, alternatively at least about 50, alternatively at least about 60, wt. % based on total weight of the super phosphoric acidic stream. The super phosphoric acidic stream may have an acid concentration in an amount of from about 40 to about 90, alternatively from about 50 to about 85, alternatively from about 60 to about 80, wt. % based on total weight of the super phosphoric acidic stream. The system 10 may further include additional components, such as a hot aging tank 38 and a super phosphoric acid filter 40.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

EXAMPLES

Example 1

Scale Inhibitors Utilized at 50 ppm/42 wt. % Phosphoric Acid/80□

Exemplary scale inhibitors (E1-E12) and comparative scale inhibitors (C1-C7) were prepared in accordance with Table 1. The exemplary and comparative scale inhibitors were evaluated for deposition inhibition of gypsum scale in a composition including 42 wt. % of phosphoric acid, 500 ppm of Fe ions, and 500 ppm of Al ions, 3,500 ppm of Ca ions, 20,000 ppm of sulfates, each based on total weight of the composition. The evaluations were conducted at a temperature of 800 after 6 hours of agitation at 150 rpm. Each of the scale inhibitors were utilized in an amount of 50 ppm based on total weight of the composition. Results of the evaluation are provided in Table 1 below and illustrated in FIGS. 2-5.

TABLE 1

| | Phosphate 1 (wt. %) | Phosphate 2 (wt. %) | Phosphate 3 (wt. %) | Phosphate 4 (wt. %) | Phosphonate 1 (wt. %) | Phosphonate 2 (wt. %) | Phosphonate 3 (wt. %) | Phosphonate 4 (wt. %) | Deposition Inhibition % |
|---|---|---|---|---|---|---|---|---|---|
| E1* | 100 | — | — | — | — | — | — | — | 39.16 |
| E2 | 80 | 20 | — | — | — | — | — | — | 60.11 |
| E3 | 50 | 50 | — | — | — | — | — | — | 43.00 |
| E4 | 20 | 80 | — | — | — | — | — | — | 39.57 |
| C1 | — | 100 | — | — | — | — | — | — | 24.31 |
| E5* | 100 | — | — | — | — | — | — | — | 39.16 |
| E6 | 80 | — | — | — | 20 | — | — | — | 47.44 |
| E7 | 50 | — | — | — | 50 | — | — | — | 64.74 |
| E8 | 20 | — | — | — | 80 | — | — | — | 59.55 |
| C2 | — | — | — | — | 100 | — | — | — | 41.43 |
| E9* | 100 | — | — | — | — | — | — | — | 39.16 |
| E10 | 80 | — | — | — | — | 20 | — | — | 59.23 |
| E11 | 50 | — | — | — | — | 50 | — | — | 58.57 |
| E12 | 20 | — | — | — | — | 80 | — | — | 61.91 |
| C3 | — | — | — | — | — | 100 | — | — | 20.21 |
| E13* | 100 | — | — | — | — | — | — | — | 39.16 |
| E14 | 80 | — | — | — | — | — | 20 | — | 62.51 |
| E15 | 50 | — | — | — | — | — | 50 | — | 37.68 |
| E16 | 20 | — | — | — | — | — | 80 | — | 47.32 |
| C4 | — | — | — | — | — | — | 100 | — | 43.01 |
| E17* | 100 | — | — | — | — | — | — | — | 39.16 |
| E18 | 80 | — | — | — | — | — | — | 20 | 55.84 |
| E19 | 50 | — | — | — | — | — | — | 50 | 54.11 |
| E20 | 20 | — | — | — | — | — | — | 80 | 59.22 |
| C5 | — | — | — | — | — | — | — | 100 | 24.98 |
| C6 | — | — | 100 | — | — | — | — | — | 7.43 |
| C7 | — | — | — | 100 | — | — | — | — | 2.66 |

*E1, E5, E9, E13, and E17 are results of the same experiment, and illustrated and described separately for ease of comparison,
Phosphate 1 is sodium poly(phosphate) (long chain SHMP) which is an inorganic phosphate according to formula (II) wherein n is 21. Phosphate 1 is commercially available.
Phosphate 2 is tetrasodium pyrophosphate (TSPP) which is an inorganic phosphate according to formula (IV). Phosphate 2 is commercially available.
Phosphate 3 is Sodium triphosphate (STPP) which is an inorganic phosphate according to formula (IV). Phosphate 3 is commercially available.
Phosphate 4 is Sodium trimetaphosphate (STMP) which is an inorganic phosphate according to formula (IV). Phosphate 4 is commercially available.
Phosphonate 1 is hexamethylenediaminetetra (methylene phosphonic acid) (HMDTMPA) which is an organic phosphonate. Phosphonate 1 is commercially available.
Phosphonate 2 is diethylene triamine pentamethylene phosphonic acid (DETPMPA) which is an organic phosphonate. Phosphonate 2 is commercially available.
Phosphonate 3 is bis(hexamethylene triamine penta (methylene phosphonic acid)) (BHMTPMPA) which is an organic phosphonate. Phosphonate 3 is commercially available.
Phosphonate 4 is 1-hydroxyethylidene-1,1-diphosphonic acid (HEDP) which is an organic phosphonate. Phosphonate 4 is commercially available.

As shown in Table 1, the exemplary scale inhibitors (E1-E20) generally exhibit improved deposition inhibition as compared to the comparative scale inhibitors (C1-C7). In particular, the exemplary scale inhibitors including only Phosphate 1 (E1, E5, E9, E13, and E17) exhibit improved deposition inhibition or at least similar deposition inhibition to the comparative scale inhibitors including only Phosphate 2 (C1), Phosphonate 1 (C2), Phosphonate 2 (C3), Phosphonate 3 (C4), Phosphonate 4 (C5), Phosphate 3 (C6), and Phosphate 4 (C7).

Exemplary scale inhibitors including blends of Phosphate 1 with Phosphate 2 (E2-E4), Phosphonate 1 (E6-E8), Phosphonate 2 (E10-12), Phosphonate 3 (E14-E16), or Phosphonate 4 (E18-E20) exhibit significant improvements in deposition inhibition or at least comparable inhibition as compared to scale inhibitors including only a single compound (E1, E5, E9, E13, E17, C1, C2, C3, C4, C5, C6, and C7). Without being bound by theory, it is believed that the blends of an inorganic phosphate according to formula (II) with an inorganic phosphate according to formula (IV) or an organic phosphonate exhibit synergistic effects in that these blends provide superior deposition inhibition as compared to the deposition inhibition utilizing each of the compounds separately.

Example 2

Scale Inhibitors Utilized at 50 ppm or 75 ppm/57 wt. % Phosphoric Acid/80□

Figure 6:
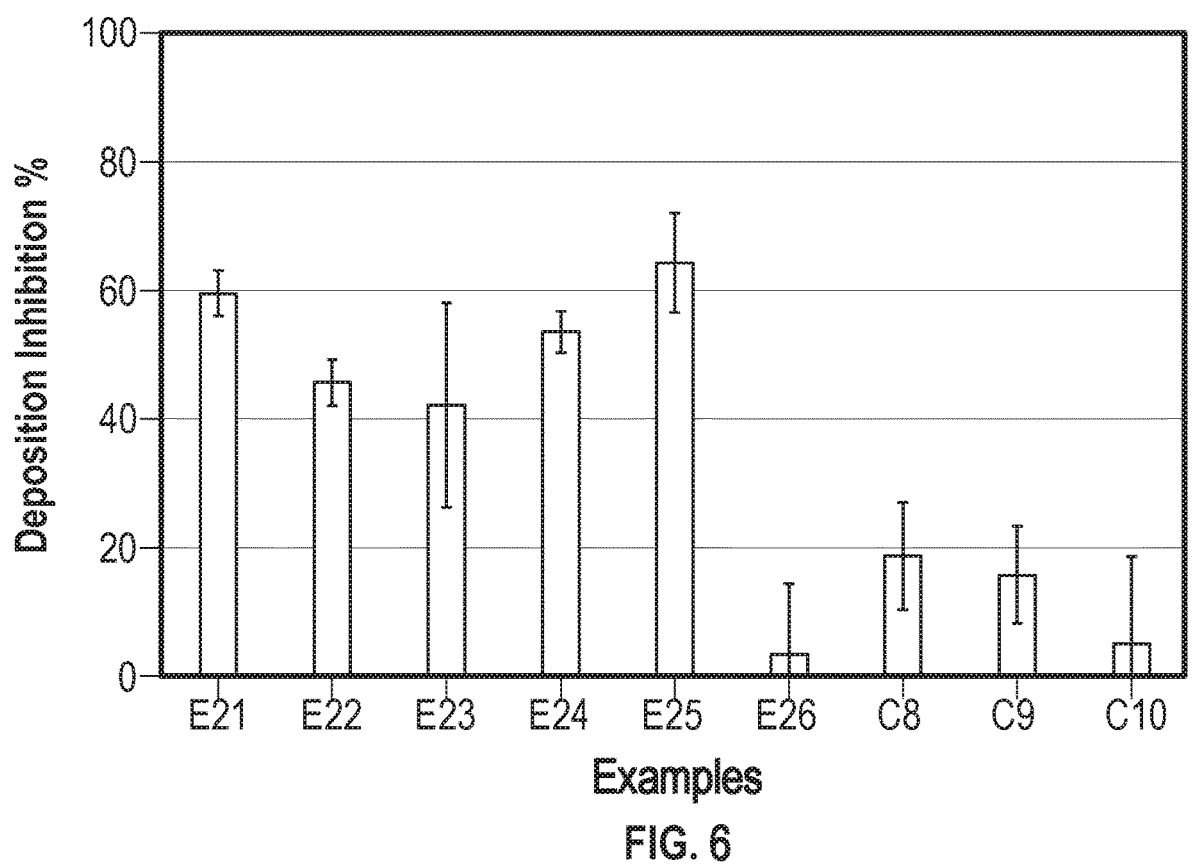
FIG. 6 is chart illustrating additional experimental data of a non-limiting embodiment of the system of FIG. 1.

Exemplary scale inhibitors (E21-E26) and comparative scale inhibitors (C8-C10) were prepared in accordance with Table 2. The exemplary and comparative scale inhibitors were evaluated for deposition inhibition of gypsum scale in a composition including 57 wt. % of phosphoric acid, 500 ppm of Fe ions, 500 ppm of Al ions, 3,5000 ppm of Ca ions, 20,000 ppm of sulfates, each based on total weight of the composition. The evaluations were conducted at a temperature of 800 after 6 hours of agitation at 150 rpm. Each of the scale inhibitors were utilized in an amount of 75 ppm based on total weight of the composition. Results of the evaluation are provided in Table 2 below and illustrated in FIG. 6.

As shown in Table 2, the exemplary scale inhibitors (E21-E26) generally exhibit significantly improved deposition inhibition as compared to the comparative scale inhibitors (C8-C10) with the exception of E26. In particular, the exemplary scale inhibitors including blends of Phosphate 1 with Phosphate 2 (E22), Phosphonate 1 (E21), Phosphonate 2 (E23), or Phosphonate 3 (E24 and E25) exhibit significant improvements in deposition inhibition as compared to scale inhibitors including only a single compound (E26, C7, C8, and C9). Without being bound by theory, it is believed that the blends of an inorganic phosphate according to formula (II) with an inorganic phosphate according to formula (IV) or an organic phosphonate exhibit synergistic effects in that these blends provide superior deposition inhibition as compared to the deposition inhibition utilizing each of the compounds separately.

Example 3

Scale Inhibitors Utilized at 50 ppm/42 wt. % Phosphoric Acid/80° C./High Polyvalent Ions Exemplary scale inhibitors (E27-E31) were prepared in accordance with Table 3. The exemplary scale inhibitors were evaluated for deposition inhibition of gypsum scale in a composition including 42 wt. % of phosphoric acid, 2,500 ppm of Fe ions, 2,500 ppm of Al ions, 3,5000 ppm of Ca ions, 20,000 ppm of sulfates, each based on total weight of the composition. The evaluations were conducted at a temperature of 80° C. after 6 hours of agitation at 150 rpm. Each of the scale inhibitors were utilized in an amount of 50 ppm based on total weight of the composition. Results of the evaluation are provided in Table 3 below.

TABLE 2

|  | Phosphate 1 (wt. %) | Phosphate 2 (wt. %) | Phosphonate 1 (wt. %) | Phosphonate 2 (wt. %) | Phosphonate 3 (wt. %) | Deposition Inhibition % |
|---|---|---|---|---|---|---|
| E21 | 50 | — | 50 | — | — | 60.18 |
| E22 | 80 | 20 | — | — | — | 45.73 |
| E23 | 80 | — | — | 20 | — | 42.65 |
| E24 | 80 | — | — | — | 20 | 53.87 |
| E25 | 20 | — | — | — | 80 | 65.28 |
| E26 | 100 | — | — | — | — | 3.28 |
| C8 | — | — | — | — | 100 | 18.81 |
| C9 | — | — | — | 100 | — | 16.05 |
| C10 | — | — | 100 | — | — | 4.47 |

Phosphate 1 is sodium poly(phosphate) (long chain SHMP) which is an inorganic phosphate according to formula (II) wherein n is an integer having a value of 21. Phosphate 1 is commercially available.
Phosphate 2 is tetrasodium pyrophosphate (TSPP) which is an inorganic phosphate according to formula (IV). Phosphate 2 is commercially available.
Phosphonate 1 is hexamethylenediaminetetra (methylene phosphonic acid) (HMDTMPA) which is an organic phosphonate. Phosphonate 1 is commercially available.
Phosphonate 2 is diethylene triamine pentamethylene phosphonic acid (DETPMPA) which is an organic phosphonate. Phosphonate 2 is commercially available.
Phosphonate 3 is bis(hexamethylene triamine penta (methylene phosphonic acid)) (BHMTPMPA) which is an organic phosphonate. Phosphonate 3 is commercially available.

TABLE 3

|  | Phosphate 1 (wt. %) | Phosphate 2 (wt. %) | Phosphonate 1 (wt. %) | Phosphonate 2 (wt. %) | Phosphonate 3 (wt. %) | Deposition Inhibition % |
|---|---|---|---|---|---|---|
| E27 | 50 | — | 50 | — | — | 43.81 |
| E28 | 80 | 20 | — | — | — | 34.08 |
| E29 | 80 | — | — | 20 | — | 39.67 |
| E30 | 80 | — | — | — | 20 | 41.24 |
| E31 | 20 | — | — | — | 80 | 44.38 |

Phosphate 1 is sodium poly(phosphate) (long chain SHMP) which is an inorganic phosphate according to formula (II) wherein n is an integer having a value of 21. Phosphate 1 is commercially available.
Phosphate 2 is tetrasodium pyrophosphate (TSPP) which is an inorganic phosphate according to formula (IV). Phosphate 2 is commercially available.
Phosphonate 1 is hexamethylenediaminetetra (methylene phosphonic acid) (HMDTMPA) which is an organic phosphonate. Phosphonate 1 is commercially available.
Phosphonate 2 is diethylene triamine pentamethylene phosphonic acid (DETPMPA) which is an organic phosphonate. Phosphonate 2 is commercially available.
Phosphonate 3 is bis(hexamethylene triamine penta (methylene phosphonic acid)) (BHMTPMPA) which is an organic phosphonate. Phosphonate 3 is commercially available.

Exemplary scale inhibitors including blends of Phosphate 1 with Phosphate 2 (E27), Phosphonate 1 (E28), Phosphonate 2 (E29), or Phosphonate 3 (E30 and E31) exhibit significant improvements in deposition inhibition. Without being bound by theory, it is believed that the blends of an inorganic phosphate according to formula (II) with an inorganic phosphate according to formula (IV) or an organic phosphonate exhibit synergistic effects in that these blends provide superior deposition inhibition as compared to the deposition inhibition utilizing each of the compounds separately.

Example 4

Long Chain SHMP vs. Regular Chain SHMP

Exemplary scale inhibitors having different chains lengths were evaluated for deposition inhibition of gypsum scale in a composition including 42 wt. % of phosphoric acid, 0 ppm of Fe ions, 0 ppm of Al ions, 3,5000 ppm of Ca ions, 20,000 ppm of sulfates, each based on total weight of the composition. The evaluations were conducted at a temperature of 600 after 6 hours of agitation at 1500 rpm. The exemplary scale inhibitors were utilized in an amount of 5 ppm based on total weight of the composition. Results of the evaluation are provided in Table 4 below.

TABLE 4

|  | Result 1 | Result 2 | Result 3 |
|---|---|---|---|
| Phosphate 1 | 76.9 | 72.9 | 80.9 |
| Phosphate 5 | 61.1 | 69.1 | — |

Phosphate 1 is sodium poly(phosphate) (long chain SHMP) which is an inorganic phosphate according to formula (II) wherein n is an integer having a value of 21. Phosphate 1 is commercially available.
Phosphate 5 is sodium hexametaphosphate (regular chain SHMP) which is an inorganic phosphate according to formula (I) wherein m is an integer having a value of 6. Phosphate 5 is commercially available.

As shown in Table 4, the exemplary scale inhibitor Phosphate 1 which has a chain length of 21 exhibits superior deposition inhibition as compared to the exemplary scale inhibitor Phosphate 5 which has a chain length of 6. Without being bound by theory, it is believed that the increase in chain length of the Phosphate 1 results in an improvement in deposition inhibition.

What is claimed is:

1. A method for reducing formation of scale in phosphoric acid production, wherein a phosphate-containing ore is combined with an acid to form an acidic slurry and the acidic slurry is processed to form an acidic stream, the method comprising:

providing a scale inhibitor comprising;
an inorganic phosphate according to formula (I), $$(XPO_3)_m \quad (I)$$

wherein X is Na, K, H, or combinations thereof, and m is an integer having a value of at least 6,
an inorganic phosphate according to formula (II), $$Y_{n+2}P_nO_{3n+1} \quad (II)$$

wherein Y is Na, K, H, or combinations thereof, and n is an integer having a value of at least 6, or
a combination thereof;
combining the scale inhibitor and at least one of the phosphate-containing ore, the acidic slurry, and the acidic stream, to reduce the formation of scale.

2. The method of claim 1, wherein the inorganic phosphate of formula (I) comprises sodium hexametaphosphate and wherein m of formula (I) is an integer having a value of 6.

3. The method of claim 1, wherein the inorganic phosphate of formula (II) comprises sodium poly(phosphate) and wherein n of formula (II) is an integer having a value of 21.

4. The method of claim 1, wherein the scale inhibitor further comprises:
an additional inorganic phosphate according to formula (III), $$(ZPO_3)_o \quad (III)$$

wherein Z is Na, K, H, or combinations thereof, and o is an integer having a value of no greater than 4;
an additional inorganic phosphate according to formula (IV), $$Z_{p+2}P_pO_{3p+1} \quad (IV)$$

wherein Z is Na, K, H, or combinations thereof, and p is an integer having a value of no greater than 4;
an organic phosphonate; or
combinations thereof.

5. The method of claim 4, wherein the additional inorganic phosphate comprises tetrasodium pyrophosphate.

6. The method of claim 4, wherein the organic phosphonate comprises 2-phosphonobutane-1,2,4-tricarboxylic acid, 1-hydroxyethane 1,1-diphosphonic acid, bis(phosphonomethyl)aminotris(methylenephosphonic acid), bis(hexamethylene triamine penta (methylene phosphonic acid)), hexamethylenediaminetetra (methylene phosphonic acid), diethylene triamine pentamethylene phosphonic acid, or combinations thereof.

7. The method of claim 6, wherein the organic phosphonate comprises bis(hexamethylene triamine penta (methylene phosphonic acid)), hexamethylenediaminetetra (methylene phosphonic acid), diethylene triamine pentamethylene phosphonic acid, 1-hydroxyethane 1,1-diphosphonic acid, or combinations thereof.

8. The method of claim 1, wherein at least one of the acidic slurry and the acidic stream have an acid concentration in an amount of greater than about 10%.

9. The method of claim 1, wherein at least one of the acidic slurry and the acidic stream have a temperature of at least about 20° C.

10. The method of claim 1, wherein the phosphate-containing ore is combined with the acid in a digester to form the acidic slurry.

11. The method of claim 10, wherein the step of combining the scale inhibitor is further defined as combining the scale inhibitor and the acidic slurry in the digester.

12. The method of claim 10, wherein the step of combining the scale inhibitor is further defined as combining the scale inhibitor and the acidic slurry after the digester.

13. The method of claim 1, wherein the acidic slurry is processed utilizing a filter to form the acidic stream and the acidic stream is further processed utilizing an evaporator.

14. The method of claim 13, wherein the step of combining the scale inhibitor is further defined as combining the scale inhibitor and the acidic stream after the filter.

15. The method of claim 14, wherein the step of combining the scale inhibitor is further defined as combining the scale inhibitor and the acidic slurry after the filter and before the evaporator.

16. The method of claim 1, wherein the acid comprises sulfuric acid.

17. The method of claim 1, wherein the scale comprises calcium sulfate.

18. A method for reducing formation of scale in phosphoric acid production, wherein a phosphate-containing ore is combined with an acid to form an acidic slurry and the acidic slurry is processed to form an acidic stream, the method comprising:

providing a scale inhibitor comprising;
    sodium poly(phosphate) according to formula (II), $$Na_{n+2}P_nO_{3n+1} \qquad (II)$$

wherein n is an integer having a value of 21, and
    at least one of;
        an additional organic phosphonate comprising bis (hexamethylene triamine penta (methylene phosphonic acid)), hexamethylenediaminetetra (methylene phosphonic acid), diethylene triamine pentamethylene phosphonic acid, 1-hydroxyethane 1,1-diphosphonic acid, or combinations thereof, and
        an inorganic phosphate comprising tetrasodium pyrophosphate; and
combining the scale inhibitor and at least one of the phosphate-containing ore, the acidic slurry, and the acidic stream, to reduce the formation of scale.

* * * * *